(12) United States Patent
Månsson et al.

(10) Patent No.: US 8,416,891 B2
(45) Date of Patent: Apr. 9, 2013

(54) OPTIMIZED PHYSICAL BROADCAST CHANNEL RECEPTION

(75) Inventors: Philip Månsson, Furulund (SE); Jose Flordelis, Lund (SE); Enric Rovira, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 908 days.

(21) Appl. No.: 12/503,911

(22) Filed: Jul. 16, 2009

(65) Prior Publication Data

US 2011/0013730 A1 Jan. 20, 2011

(51) Int. Cl.
- H03D 1/00 (2006.01)
- H04W 40/00 (2009.01)
- G01S 3/02 (2006.01)

(52) U.S. Cl.
USPC .................. 375/343; 342/463; 455/446

(58) Field of Classification Search .................. 375/343
See application file for complete search history.

(56) References Cited

U.S. PATENT DOCUMENTS

| | | | |
|---|---|---|---|
| 6,049,315 A * | 4/2000 | Meyer | 343/895 |
| 6,341,223 B1 * | 1/2002 | Park | 455/446 |
| 6,370,475 B1 * | 4/2002 | Breed et al. | 701/301 |
| 6,456,239 B1 * | 9/2002 | Werb et al. | 342/463 |
| 6,501,963 B1 * | 12/2002 | Balents et al. | 455/562.1 |
| 2003/0089771 A1 * | 5/2003 | Cybulski et al. | 235/385 |
| 2004/0063450 A1 * | 4/2004 | Uhlik | 455/517 |
| 2004/0165685 A1 * | 8/2004 | Kitakado | 375/343 |
| 2004/0219959 A1 * | 11/2004 | Khayrallah et al. | 455/575.7 |
| 2008/0132282 A1 * | 6/2008 | Liu et al. | 455/562.1 |
| 2009/0060088 A1 | 3/2009 | Callard et al. | |
| 2009/0067378 A1 * | 3/2009 | Luo et al. | 370/329 |
| 2009/0176463 A1 | 7/2009 | Raaf et al. | |

OTHER PUBLICATIONS

PCT International Search Report, dated Nov. 26, 2010, in connection with International Application No. PCT/EP20101058923.
PCT Written Opinion, dated Nov. 26, 2010, in connection with International Application No. PCT/EP2010/058923.
Qualcomm Europe: "On the eNodeB Tx Antenna Configuration in PBCH", 3GPP Draft; R1-080489, 3GPP, Mobile Competence Centre; 650, Route Des Lucioles; F-06921 Sophia-Antipolis Cedex; France, vol. RAN WG1, No. Sevilla, Spain; 20080109, Jan. 9, 2008, XP050109006.
Nortel: "The Reliability Improvement of the Blind Detection of the Antenna Configuration" 3GPP Draft; R1-080379 (Nortel-Blind Detections TX Antenna), 3GPP, Mobile Competence Centre; 650, Route Des Lucioles; F-06921 Sophia-Antipolis Cedex; France, vol. RAN WG1, No. Sevilla, Spain; 20080109, Jan. 9, 2008, XP050108898.

* cited by examiner

*Primary Examiner* — David C. Payne
*Assistant Examiner* — Sarah Hassan
(74) *Attorney, Agent, or Firm* — Potomac Patent Group PLLC

(57) ABSTRACT

A receiver receives information from a physical broadcast channel signal, wherein the receiver includes a blind processing and decoding unit that utilizes a hypothesis about how many transmit antennas were used to transmit the signal. Received signal characteristics are detected that indicate how many transmit antennas were used. Each transmit antenna hypothesis in a stored list represents how many transmit antennas were used. For each of the stored hypotheses, a probability value is determined based, at least in part, on the detected signal characteristics. The list of hypotheses is modified to associate the probability values with respective ones of the transmit antenna hypotheses. The modified list is used to provide antenna hypothesis probabilities, and the blind processing and decoding unit is operated such it begins with a most probable antenna hypothesis and continues with increasingly less probable antenna hypotheses until successful decoding occurs or all antenna hypotheses have been made.

20 Claims, 12 Drawing Sheets

OPTIMIZED PHYSICAL BROADCAST CHANNEL RECEPTION

BACKGROUND

The present invention relates to cellular communication systems, and more particularly to techniques and apparatuses for receiving information on, for example, a Physical Broadcast Channel in a cellular communication system.

To facilitate the following discussion, terminology and network configurations that comply with the Third Generation Evolved UTRAN (E-UTRAN), 3G Long Term Evolution (LTE) standard are used herein because these are known and will be readily understandable to the person of ordinary skill in the art. However, the use of this terminology and these configurations is done solely for the purpose of example rather than limitation. The various inventive aspects to be described in this document are equally applicable in many different mobile communications systems complying with different standards.

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high-capacity high-data rate system in existing radio spectrum, a new system has to be able to utilize a bandwidth of varying size. The LTE system has been developed for this purpose. It is a new flexible cellular system that can be seen as an evolution of the 3G WCDMA standard. This system will use OFDM as the multiple access technique (called OFDMA) in the downlink and Single Carrier Frequency Division Multiple Access (SC-FDMA) in the uplink. These choices support great spectrum flexibility with a number of possible deployments ranging from 1.4 MHz to 20 MHz of bandwidth allocation. Furthermore, data rates up to and exceeding 100 Mb/s will be supported for the largest bandwidth. However, it is expected that LTE will be used not only for high rate services, but also for low rate services like voice. Since LTE is designed for Transmission Control Protocol/Internet Protocol (TCP/IP), Voice over IP (VoIP) will likely be the service that carries speech.

FIG. 1 illustrates a mobile communication service area 101, such as an LTE system service area, that comprises a number of cells 103. User Equipment (UE) (e.g., the UE 105) located in a cell is served by an antenna in that cell. The antenna is coupled to a node in the communication system so that communication data can be routed between the UE and other equipment through the communication system.

A simplified cell planning diagram is depicted in FIG. 2. A core network (not shown) is connected to one or more evolved UTRAN Node Bs (eNodeB) (201-1, 201-2) (generally referred to by means of reference numeral 201). Each eNodeB 201 is capable of communicating with every other eNodeB 201 in the same network. As can be seen in FIG. 2, one eNodeB 201 connects to one or more antennas, 203-1, 203-2, ..., 203-M (generally referred to by the reference numeral 203). The eNodeB 201 is a logical node handling the transmission and reception of a set of cells. Logically, the antennas of the cells belong to the eNodeB but they are not necessarily located at the same antenna site. Thus, one eNodeB 201 can be responsible for one or more cells. It is the ability of serving cells not transmitted from the same antenna site that makes a NodeB different compared to what in other types of systems are called a "Base Transceiver Station (BTS)", "Base Station (BS)", or "Radio Base Station (RBS)". However, in this specification the term "base station" is used as a generic term, rather than a system-specific term, to further emphasize that the invention is not limited to applications in only the specific exemplary systems.

The LTE physical layer downlink transmission is based on OFDM. The basic LTE downlink physical resource can thus be seen as a time-frequency grid as illustrated in FIG. 3, in which each so-called "resource element" corresponds to one OFDM subcarrier during one OFDM symbol interval.

As illustrated in FIG. 4, the downlink subcarriers in the frequency domain are grouped into resource blocks, where each resource block consists of twelve consecutive subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

The total number of downlink subcarriers, including a DC-subcarrier, thus equals $N_c=12 \cdot N_{RB}+1$ where $N_{RB}$ is the maximum number of resource blocks that can be formed from the $12 \cdot N_{RB}$ usable subcarriers. The LTE physical-layer specification actually allows for a downlink carrier to consist of any number of resource blocks, ranging from $N_{RB\text{-}min}=6$ and upwards, corresponding to a nominal transmission bandwidth ranging from around 1 MHz up to well beyond 20 MHz. This allows for a very high degree of LTE bandwidth/spectrum flexibility, at least from a physical-layer-specification point-of-view.

FIGS. 5a and 5b illustrate the time-domain structure for LTE downlink transmission. Each 1 ms sub-frame 500 consists of two slots of length $T_{slot}=0.5$ ms ($=15360 \cdot T_S$, wherein each slot comprises 15,360 time units, $T_S$). Each slot then consists of a number of OFDM symbols.

A subcarrier spacing $\Delta f=15$ kHz corresponds to a useful symbol time $T_u=1/\Delta f \approx 66.7$ µs ($2048 \cdot T_S$). The overall OFDM symbol time is then the sum of the useful symbol time and the cyclic prefix length $T_{CP}$. Two cyclic prefix lengths are defined. FIG. 5a illustrates a normal cyclic prefix length, which allows seven OFDM symbols per slot to be communicated. The length of a normal cyclic prefix, $T_{CP}$, is $160 \cdot T_S \approx 5.1$ µs for the first OFDM symbol of the slot, and $144 \cdot T_S \approx 4.7$ µs for the remaining OFDM symbols.

FIG. 5b illustrates an extended cyclic prefix, which because of its longer size, allows only six OFDM symbols per slot to be communicated. The length of an extended cyclic prefix, $T_{CP\text{-}e}$, is $512 \cdot T_S \approx 16.7$ µs.

It will be observed that, in the case of the normal cyclic prefix, the cyclic prefix length for the first OFDM symbol of a slot is somewhat larger than those for the remaining OFDM symbols. The reason for this is simply to fill out the entire 0.5 ms slot, as the number of time units per slot, $T_S$, (15360) is not evenly divisible by seven.

When the downlink time-domain structure of a resource block is taken into account (i.e., the use of 12 subcarriers during a 0.5 ms slot), it will be seen that each resource block consists of 12·7=84 resource elements for the case of normal cyclic prefix (illustrated in FIG. 4), and 12·6=72 resource elements for the case of the extended cyclic prefix (not shown).

Within each resource block there is a set of resource elements, also known as reference symbols, set to known values. These are illustrated in FIG. 6, which shows a cell-specific reference symbol arrangement for the case of normal CP length for one antenna port. Reference symbols can be used by, for example, the User Equipment (UE) to estimate the downlink channel for coherent detection. The reference symbols are also used as part of the LTE mobility function as described below.

Although FIG. 6 shows the case of a single antenna port, the downlink in LTE is configured to work with multiple transmit antennas. The pattern shown in FIG. 6 is not the same, however for all configurations. Rather, different reference symbol patterns are defined for multiple antenna ports at the eNodeB. (An "antenna port" can be a single antenna, or multiple physical antennas configured to operate together.) LTE systems permit up to four cell-specific antenna ports to be used by an eNodeB, with a different reference symbol pattern within a resource element being used for each of the possibilities.

Another important aspect of a terminal's operation is mobility, aspects of which include cell search and acquisition of control data. Cell search is the procedure by which the terminal finds a cell to which it can potentially connect. As part of the cell search procedure, the terminal obtains the identity of the cell and estimates the frame timing of the identified cell. The cell search procedure also provides estimates of parameters essential for reception of system information on the broadcast channel, containing the remaining parameters required for accessing the system.

To avoid complicated cell planning, the number of physical layer cell identities should be sufficiently large. For example, systems in accordance with the LTE standards support 504 different cell identities. These 504 different cell identities are divided into 168 groups of three identities each.

In order to reduce the cell-search complexity, cell search for LTE is typically done in several steps that make up a process that is similar to the three-step cell-search procedure of WCDMA. To assist the terminal in this procedure, LTE provides a primary synchronization signal and a secondary synchronization signal on the downlink. This is illustrated in FIG. 7, which illustrates the structure of the radio interface of an LTE system. The physical layer of an LTE system includes a generic radio frame 700 having a duration of 10 ms. FIG. 7 illustrates one such frame 700 for an LTE Frequency Division Duplex (FDD) system. Each frame has 20 slots (numbered 0 through 19), each slot having a duration of 0.5 ms which normally consists of seven OFDM symbols. A sub-frame is made up of two adjacent slots, and therefore has a duration of 1 ms, normally consisting of 14 OFDM symbols. The primary and secondary synchronization signals are specific sequences, inserted into the last two OFDM symbols in the first slot of each of subframes 0 and 5. In addition to the synchronization signals, part of the operation of the cell search procedure also exploits reference signals that are transmitted at known locations in the transmitted signal.

In the first step of the cell-search procedure, the mobile terminal uses the primary synchronization signal to find the timing of the 5 ms slots. Note that the primary synchronization signal is transmitted twice in each frame. One reason for this is to simplify handover of a call from, for example, a GSM system, to an LTE system. However, transmitting the primary synchronization signal twice per frame creates an ambiguity in that it is not possible to know whether the detected Primary Synchronization Signal is associated with slot #0 or slot #5 (see FIG. 7). Accordingly, at this point of the cell-search procedure, there is a 5 ms ambiguity regarding the frame timing.

In many cases, the timing in multiple cells is synchronized such that the frame start in neighboring cells coincides in time. One reason for this is to enable MBSFN operation. However, synchronous operation of neighboring cells also results in the transmission of the primary synchronization signals in the different cells occurring at the same time. Channel estimation based on the primary synchronization signal will therefore reflect the composite channel from all such cells if the same primary synchronization signal is used in those cells. For coherent demodulation of the second synchronization signal, which is different in different cells, an estimate of the channel from the cell of interest is required, not an estimate of the composite channel from all cells. Therefore, LTE systems support multiple (presently three) sequences for the primary synchronization signals. To enable coherent reception of a particular cell's signals in a deployment with time-synchronized cells, neighboring cells are permitted to use different primary synchronization sequences to alleviate the channel estimation problem described above. If there is a one-to-one mapping between the primary synchronization signal used in a cell and the identity within a cell identity group, the identity within the cell identity group can also be determined in the first step.

In the next step, the terminal detects the cell identity group and determines the frame timing. This is done by observing pairs of slots in which the secondary synchronization signal is transmitted. To distinguish between secondary synchronization signals located in subframe #0 and subframe #5, the secondary synchronization signals are constructed in the form $(S_1, S_2)$. If $(S_1, S_2)$ is an allowable pair of sequences, where $S_1$ and $S_2$ represent the secondary synchronization signal in subframes #0 and #5, respectively, the reverse pair $(S_2, S_1)$ is not a valid sequence pair. By exploiting this property, the terminal can resolve the 5 ms timing ambiguity that resulted from the first step in the cell search procedure, and determine the frame timing. Furthermore, as each combination $(S_1, S_2)$ represents a particular one of the cell groups, the cell group identity is also obtained from the second cell search step. The identity of the cell then can be used to determine the reference (or pilot) signal sequence and its allocation in the time-frequency grid.

The synchronization signals occupy 62 resource elements in the center of the allocated bandwidth. Five resource elements on either side of the 62 resource elements are set to zero, making a total of 72 resource elements in which the synchronization signals can be found during subframes #0 and #5 as described above. To distinguish between the secondary synchronization signal $S_1$ and the secondary synchronization signal $S_2$, each is created as a function of a pair of sequences $\tilde{S}_i, \tilde{S}_j$. That is, $S_1 = f_1(\tilde{S}_1, \tilde{S}_2)$ and $S_2 = f_2(\tilde{S}_1, \tilde{S}_2)$, as illustrated in FIG. 8. Each of the sequences $\tilde{S}_i, \tilde{S}_j$ is one of 31 different M-sequences, which is essentially a certain pn-sequence.

A UE preferably includes a look-up table that associates each sequence pair and ordering with a cell group identifier and frame timing information (i.e., whether the ordering of the sequence pair indicates sub-frame 0 or sub-frame 5), so that the UE can easily identify the cell group and frame timing.

Once the cell search procedure is complete, the terminal receives the system information to obtain the remaining parameters (e.g., the transmission bandwidth used in the cell) necessary to control communications with this cell. The time-limited reception of this information is of major importance because it indirectly influences the initial cell search process. Furthermore, the practical effect of LTE systems being new is that they will not start out with 100% coverage, but will instead be introduced into geographic areas over time. Therefore, mobility from legacy systems (e.g., GSM/WCDMA) to LTE will be an important function that will call for fast acquisition of system information.

Typically, the UE will try to acquire the information contained in a cell's Master Information Block (MIB) after that cell has been successfully identified during the cell search procedure and it has been determined that the cell's signals are being received at a satisfactory signal strength. The MIB is encoded at a relatively low code rate. The encoded MIB is broadcast on a Broadcast Channel (BCH) transport block over four consecutive radio frames of a physical channel called the Physical BCH (PBCH). The beginning of the encoded MIB is placed in each radio frame that fulfills $n_f \mod 4 = 0$, where $n_f$ is a radio subframe number. Only the 72 central subcarriers of an OFDM symbol can be used for PBCH transmissions (excluding subcarriers reserved for reference signals), and PBCH transmission occurs only on OFDM symbols 0, 1, 2 and 3 in slot 1 of subframe 0.

Since the UE does not know which of the four parts (sub-blocks) of the PBCH block it is currently receiving, the purpose of the PBCH acquisition procedure is both to acquire MIB information and also to resolve the 40 ms timing uncertainty. The two Least Significant Bits (LSBs) of the subframe number (SFN) are obtained by means of a blind decoding process, in which successful decoding of the PBCH (sub-) block(s) is an indicator that the UE has correctly hypothesized the LSBs of the SFN.

There are also power consumption aspects on measurement procedures. The amount of time that a terminal requires to receive data (the "RX on" time) should be as small as possible, subject to the requirements discussed above. This is especially important for the case of PBCH reception because this procedure is performed during idle mode and its performance has a direct impact on the standby time of the mobile terminal.

The PBCH is coded and rate matched with an effective coding rate of about $\frac{1}{40}$. This means that attempts to decode a partially received BCH transport block (i.e., fewer than all four sub-blocks) may succeed if sufficiently good radio conditions exist.

LTE systems utilize a multi-antenna technique, that is, the use of multiple antennas at the receiver and/or the transmitter, in combination with more or less advanced signal processing. Multi-antenna techniques can be used to improve reception performance. Such reception techniques utilize information about how many antennas were used on the transmit side. However, this information is not given explicitly through signaling, so it is important for the receiver to be able to make the right decoding assumptions (e.g., the number of antennas that the sender is using for transmission).

Simple solutions to this problem involve sequentially decoding the received signal making each of the possible antenna hypotheses (e.g., 1, 2 or 4 antennas) or a static permutation thereof. While such approaches are simple, they incur an excess number of decoding attempts and an excess number of subframes that need to be received. Taking commercially low-end terminals into account, low cost and power consumption is of major importance. In such applications, straightforward conventional solutions as discussed above might not be sufficient.

Therefore there is a need for methods and apparatuses that improve upon the most simple PBCH acquisition methods such that hardware costs and power consumption are reduced, while still fulfilling sufficient performance.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatus that operate a radio receiver to receive information from a signal transmitted on a physical broadcast channel, wherein the radio receiver includes a blind processing and decoding unit that operates in accordance with a blind decoder algorithm that requires that a hypothesis be made about how many transmit antennas were used to transmit the signal. Such operation includes receiving a signal. One or more characteristics of the received signal are detected that are indicative of how many transmit antennas were used to transmit the signal. A stored list of transmit antenna hypotheses is accessed, wherein each of the transmit antenna hypotheses represents how many transmit antennas were used to transmit the signal. For each of the transmit antenna hypotheses stored in the list, a probability value is determined based, at least in part, on the detected one or more characteristics of the received signal. The stored list of transmit antenna hypotheses is modified to associate the probability values with respective ones of the transmit antenna hypotheses. The modified stored list of transmit antenna hypotheses is used to provide antenna hypothesis probabilities, and the blind processing and decoding unit is operated such that it begins with a most probable antenna hypothesis and continues with increasingly less probable antenna hypotheses until either a successful decoding of the signal has occurred or all antenna hypotheses have been made.

In some embodiments, determining the probability value of a transmit antenna hypothesis comprises determining from the detected one or more characteristics of the received signal whether a particular one of a number of possible antennas was used to transmit the signal.

In some embodiments, determining the probability value of a transmit antenna hypothesis is further based, at least in part, on a previously stored probability value associated with the transmit antenna hypothesis. For example, determining the probability value can include averaging a probability value representing a likelihood that the particular one of the number of possible antennas was used to transmit the signal with one or more previously stored probability values associated with the particular one of the number of possible antennas.

In some embodiments, detecting one or more characteristics of the received signal that are indicative of how many transmit antennas were used to transmit the signal includes detecting whether a reference symbol is present at a predefined time and frequency location within the received signal.

In some embodiments, the physical broadcast channel spans a plurality of radio frames and the operation of the radio receiver includes the blind processing and decoding unit identifying a radio frame that includes an initial part of the information.

In some embodiments, the information is a master information block.

BRIEF DESCRIPTION OF THE DRAWINGS

The objects and advantages of the invention will be understood by reading the following detailed description in conjunction with the drawings in which.

DETAILED DESCRIPTION

Figure 1:
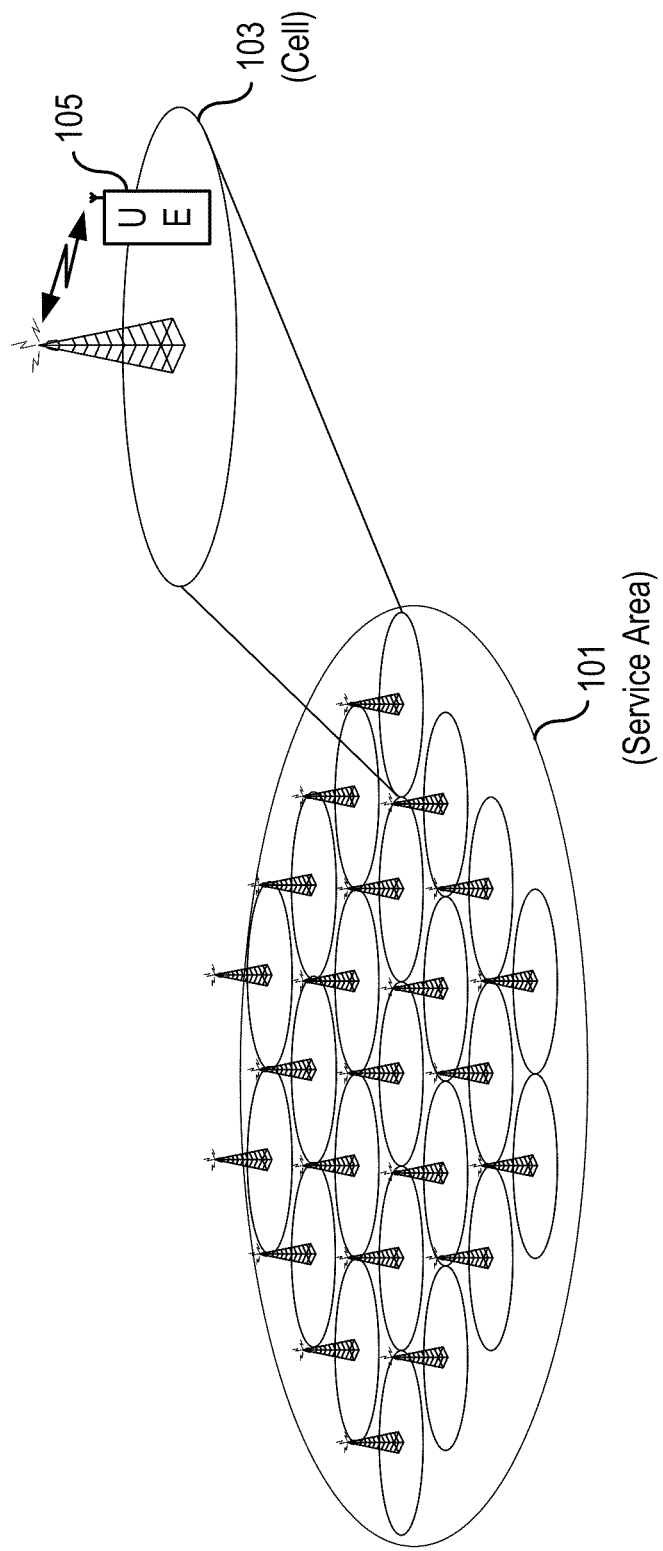
FIG. 1 illustrates a mobile communication service area, such as an LTE system service area, that comprises a number of cells.
Figure 2:
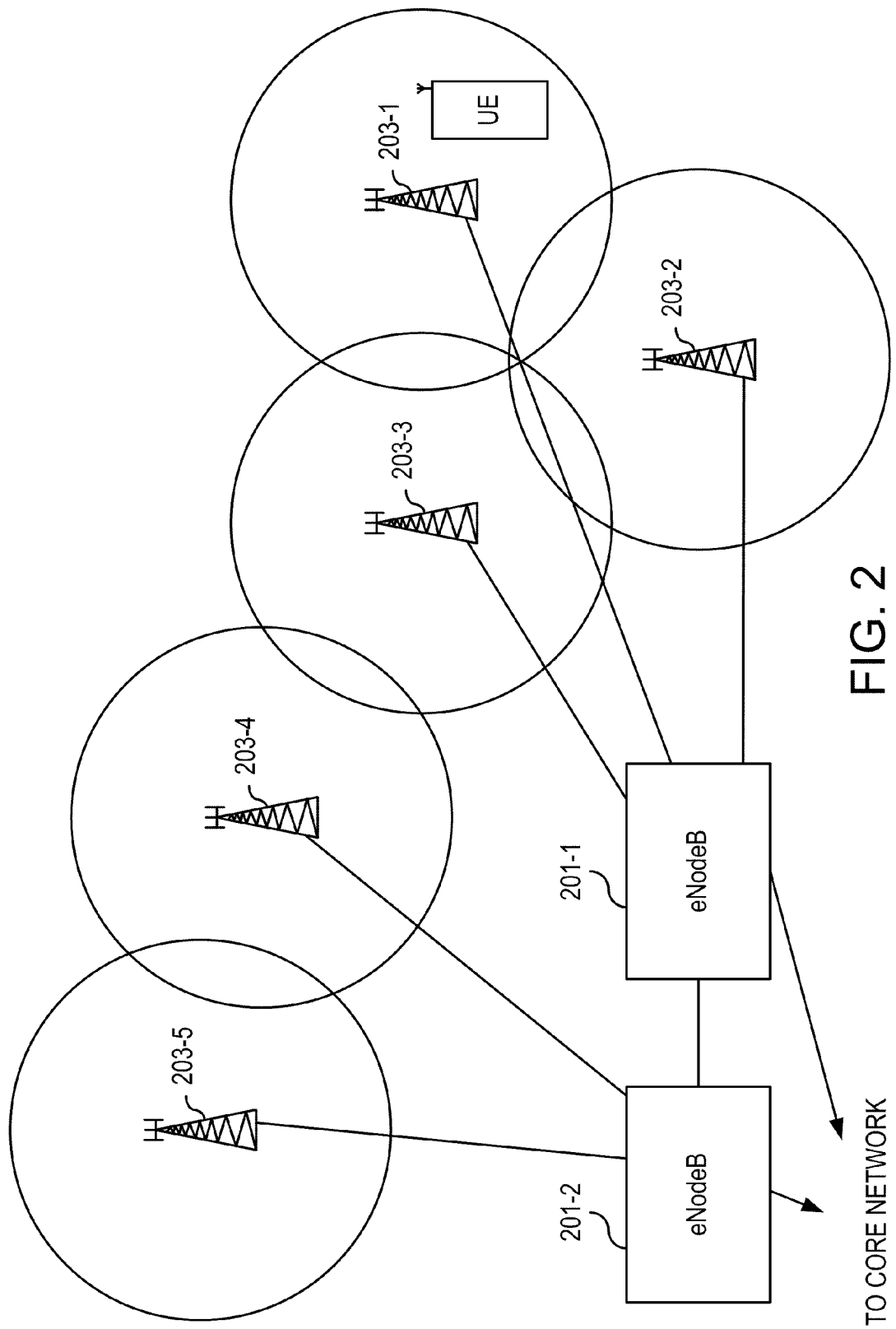
FIG. 2 is a simplified cell planning diagram.
Figure 3:
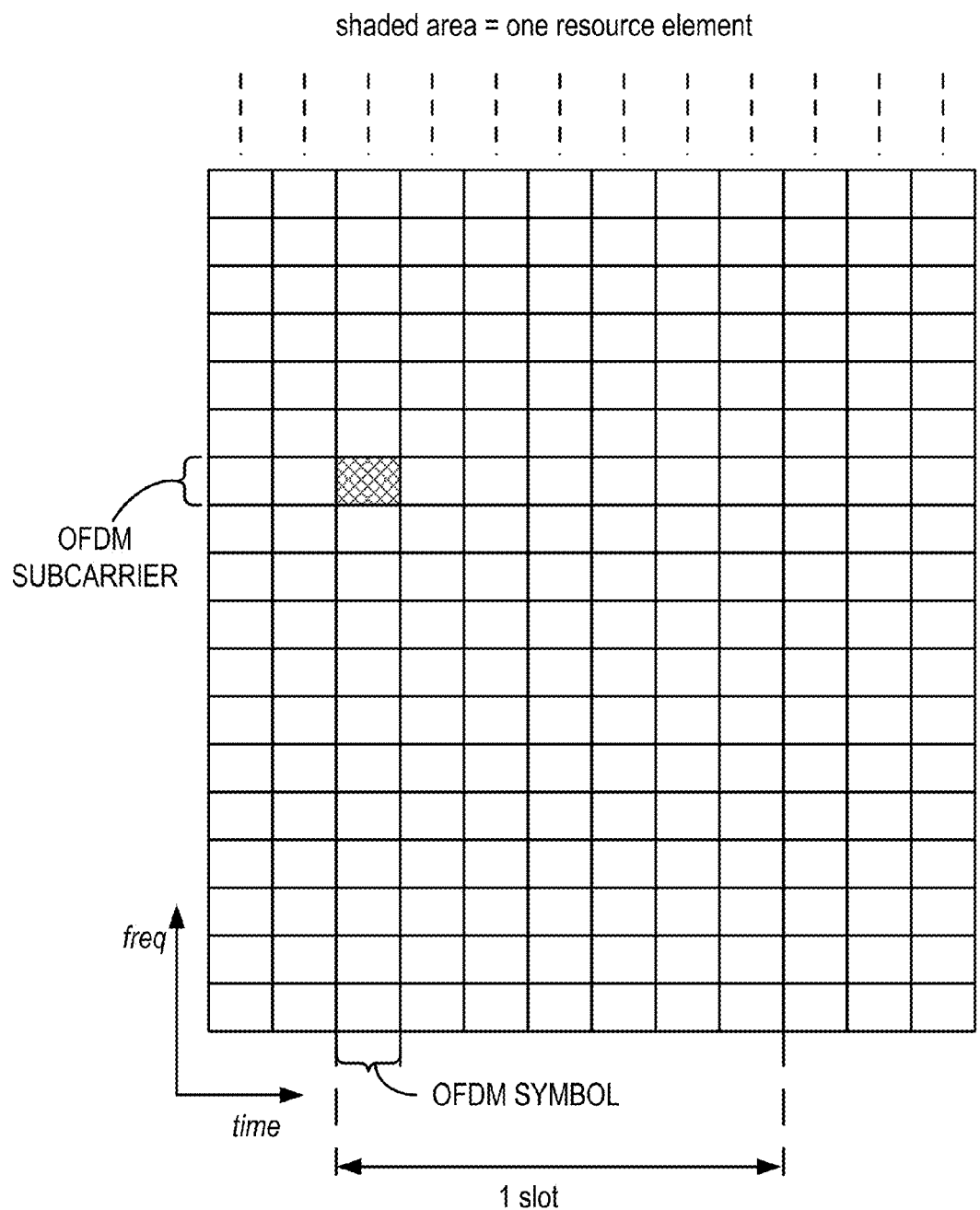
FIG. 3 is a time-frequency grid illustrating the structure of an LTE resource element.
Figure 4:
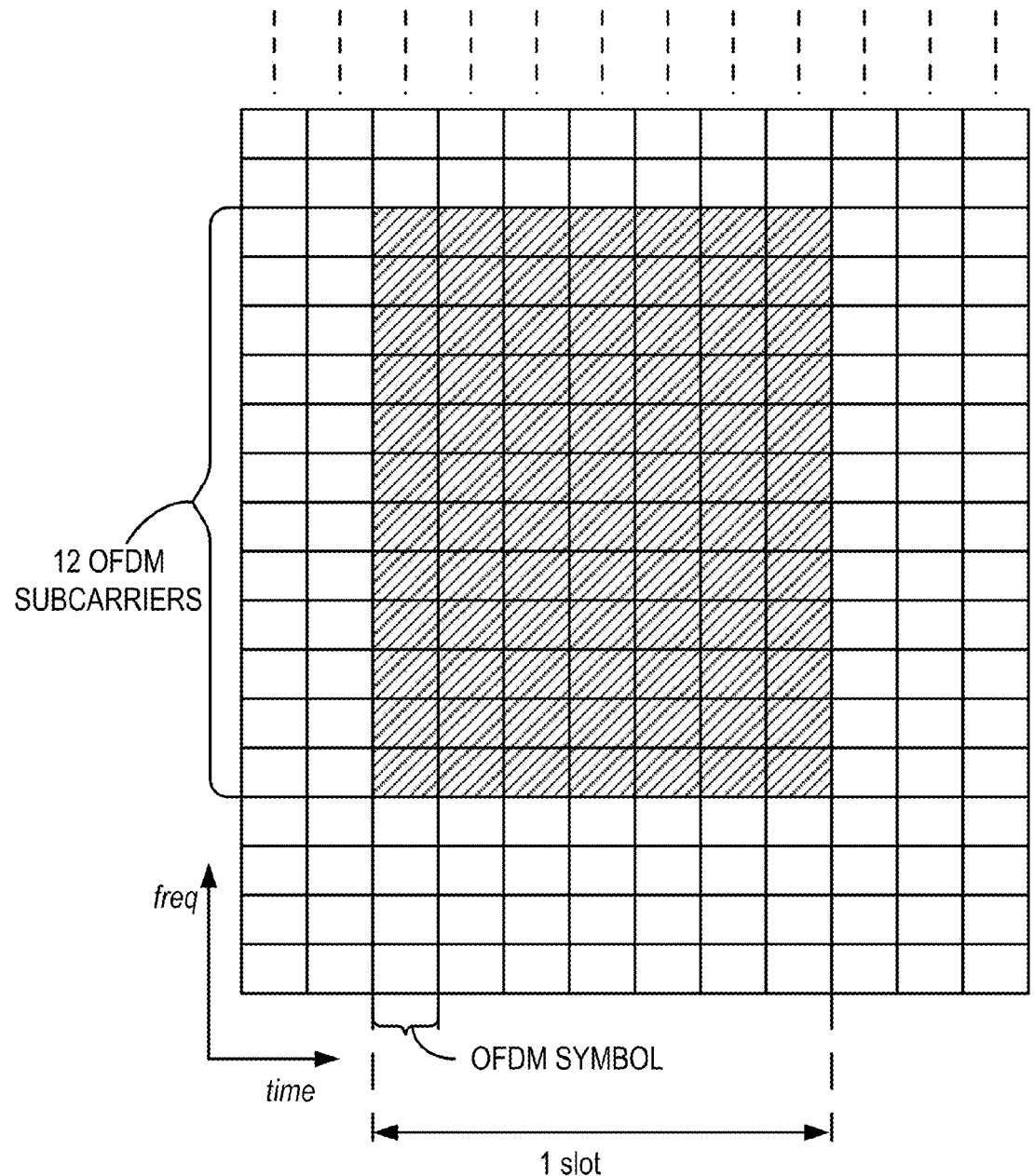
FIG. 4 illustrates how downlink subcarriers in the frequency domain are grouped into resource blocks.
Figure 5A:
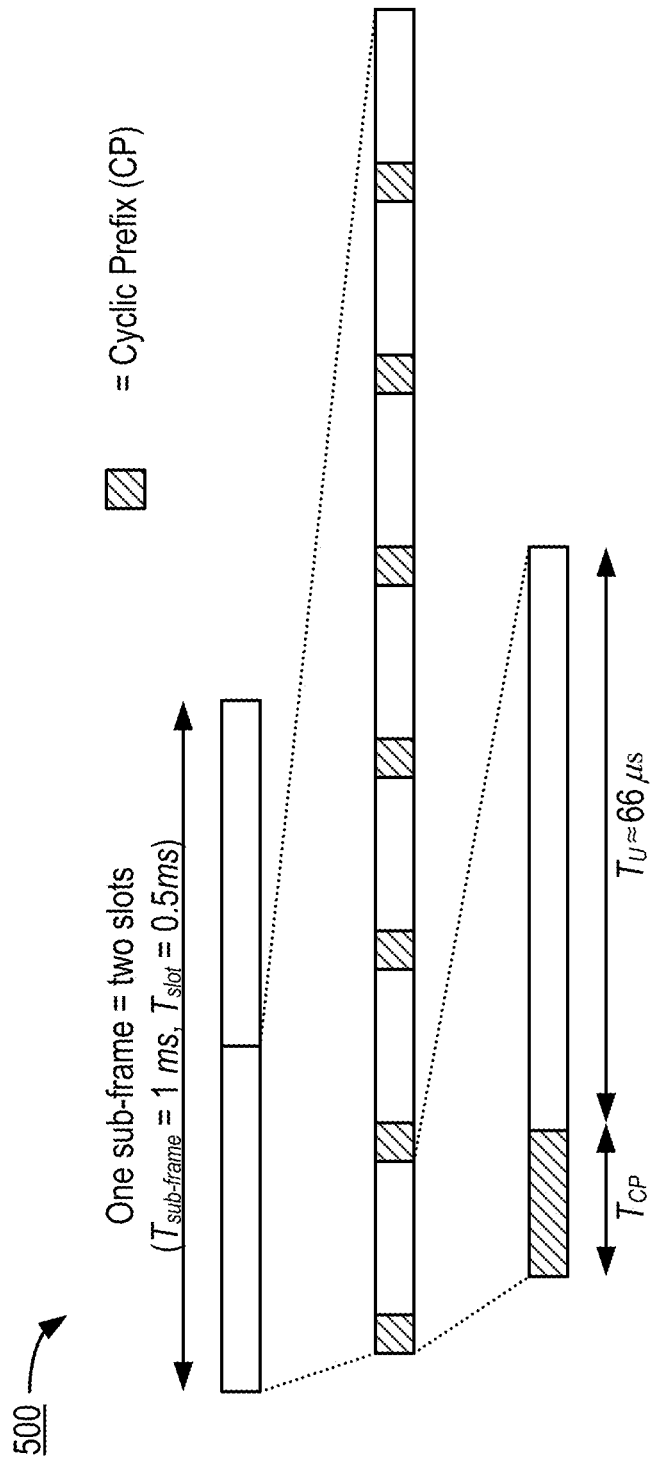
FIGS. 5a and 5b illustrate the time-domain structure for LTE downlink transmission.
Figure 5B:
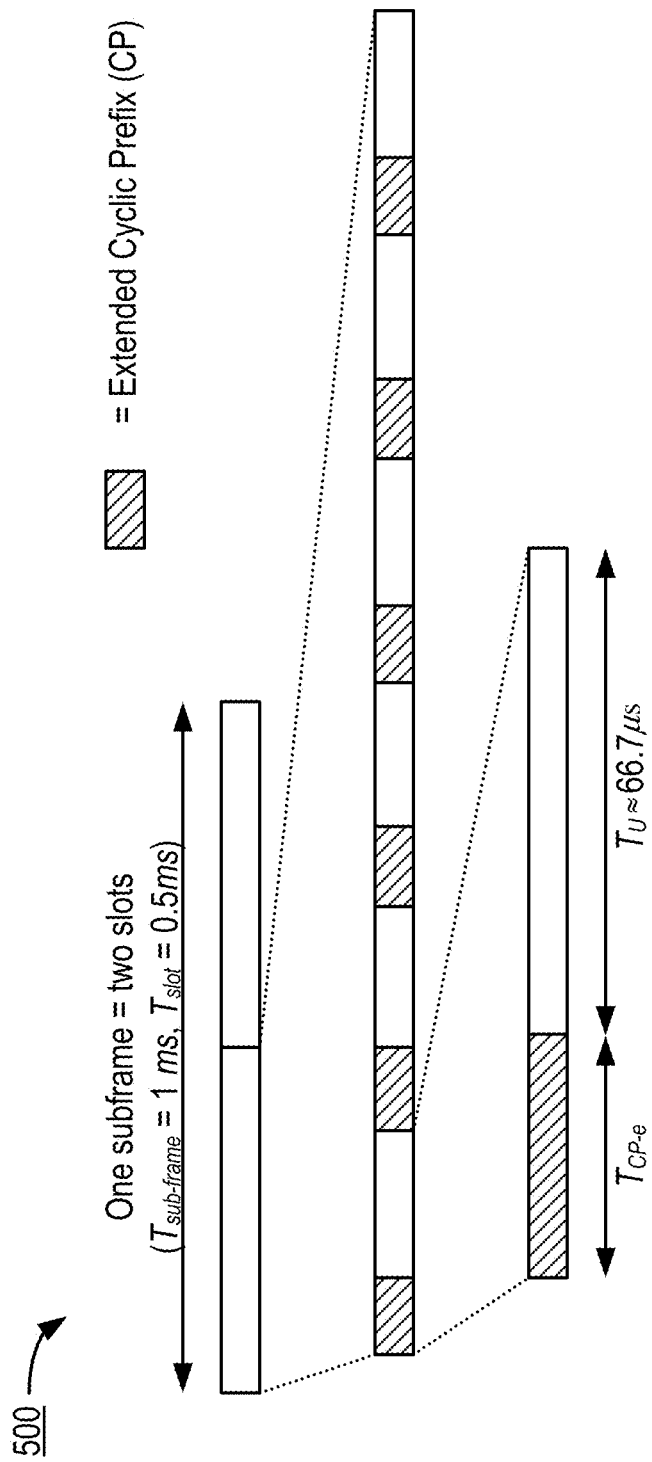
Figure 6:
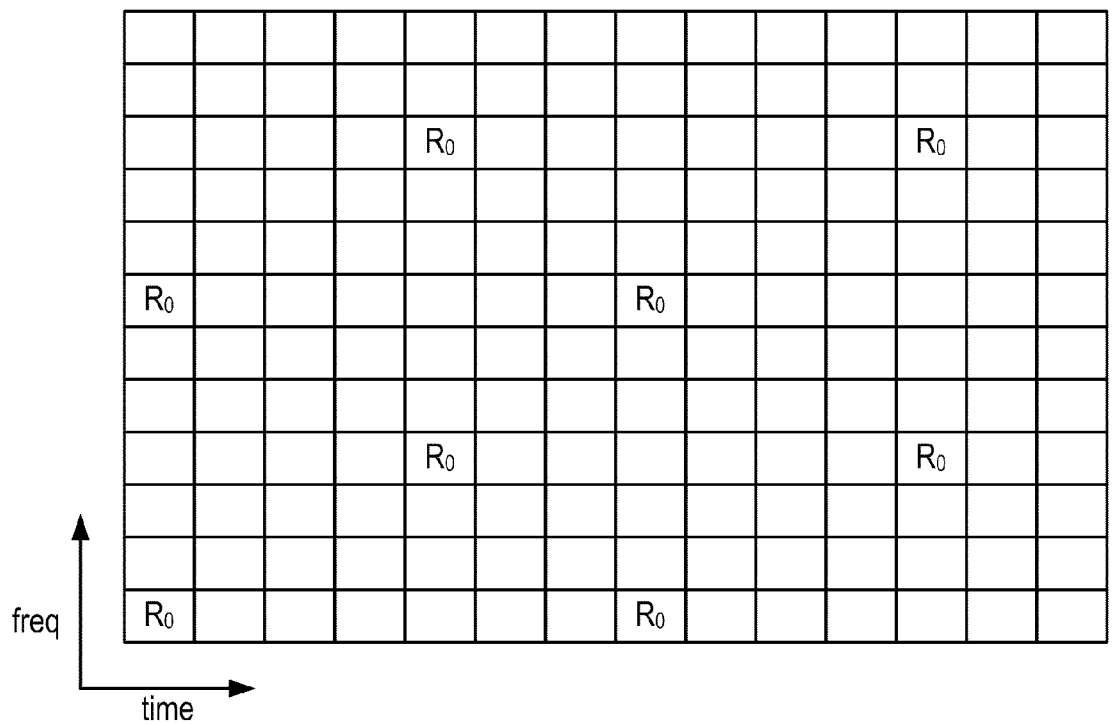
FIG. 6 shows a cell-specific reference symbol arrangement for the case of normal CP length for one antenna port.
Figure 7:
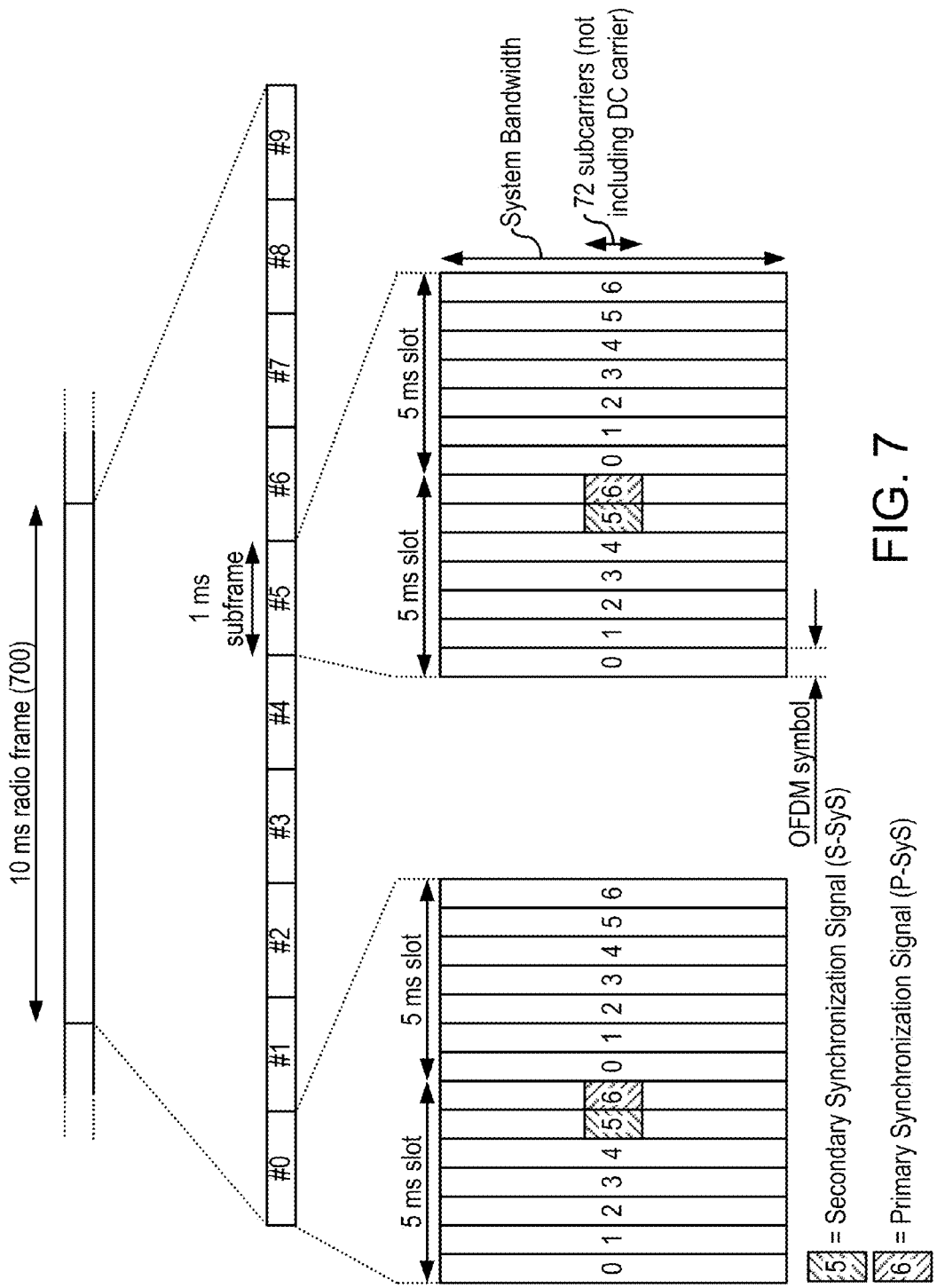
FIG. 7 illustrates the structure of the radio interface of an LTE system.
Figure 8:
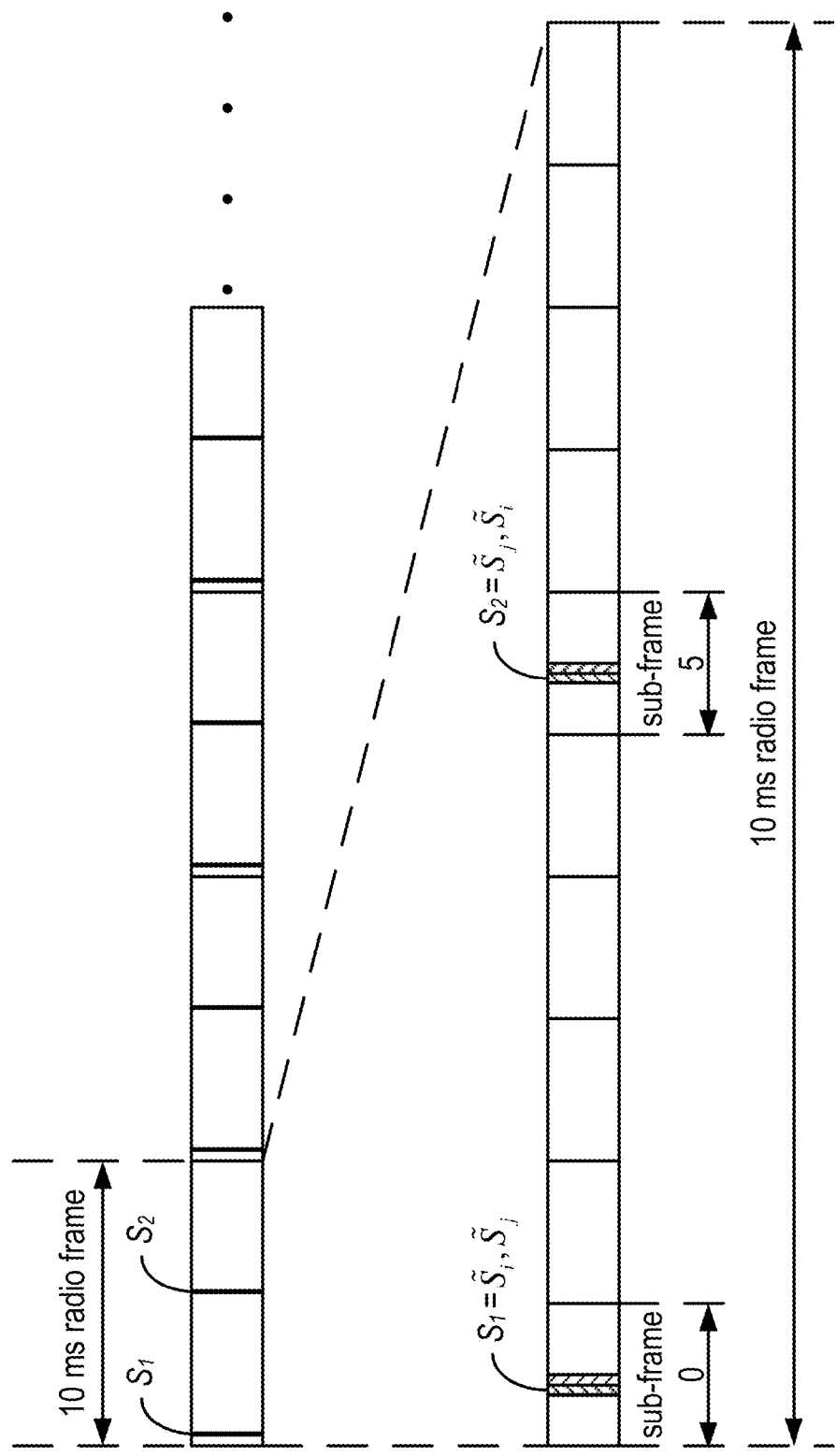
FIG. 8 illustrates how secondary synchronization signal sequences can be transmitted.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier or storage medium, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of embodiments consistent with the invention involves the UE employing a blind decoding mechanism to ascertain the number of transmitter antennas being utilized by an eNodeB of a particular cell to transmit system information. The ascertained number is then used in the PBCH blind decoding technique that resolves the LTE 40 ms timing uncertainty and also reveals how many transmit antennas were actually used. In the best case, in which the number of transmitter antennas is always accurately ascertained, the number of decoding attempts is reduced by 66% (compare to conventional techniques). These improved techniques enable, among other things, a power savings in the UE.

In an aspect of some embodiments, ascertaining the number of transmitter antennas being utilized by an eNodeB of a particular cell to transmit system information is based on ascertaining how many Reference Signals were detected in a received signal.

In an aspect of alternative embodiments, ascertaining the number of transmitter antennas being utilized by an eNodeB of a particular cell to transmit system information is based on detecting an average signal-to-noise ratio (SNR) of a received signal.

The above and other aspects will now be described in further detail in the following.

Figure 9:
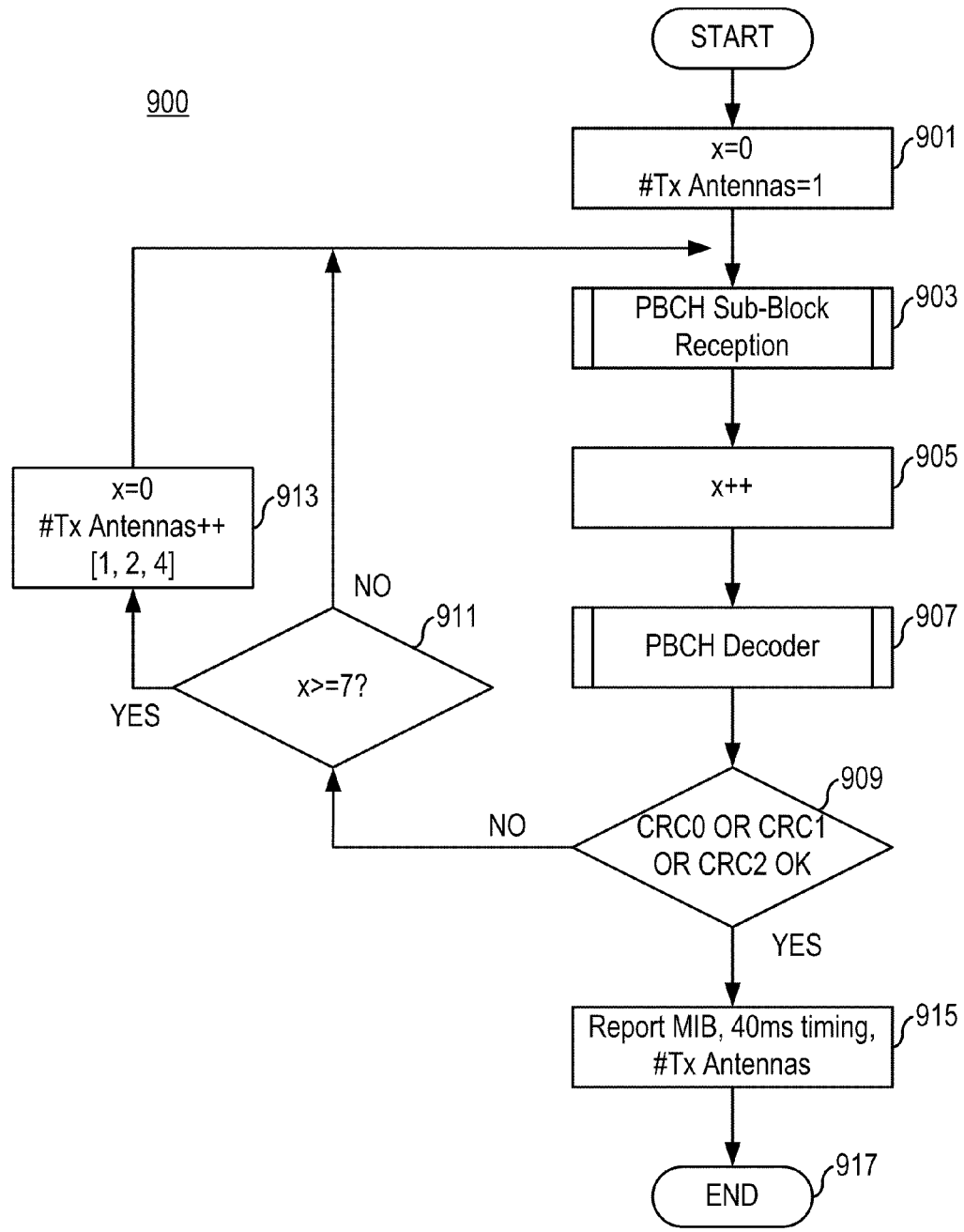
FIG. 9 is, in one respect, a flow diagram of exemplary steps/processes carried out in one or more components of a mobile communication system to effect PBCH block acquisition.

To facilitate the reader's understanding of benefits that are achieved by various inventive aspects, these will be contrasted with techniques in which these aspects are not employed. In one such example, FIG. 9 is, in one respect, a flow diagram of exemplary steps/processes carried out in one or more components of a mobile communication system to effect PBCH block acquisition. FIG. 9 can also be considered to depict a mobile communication system 800 comprising various circuitry configured to carry out the functions described herein.

The scenario begins with initialization of variables (step 901). In this embodiment, this involves initializing two variables: A variable, #TxAntennas, is initialized to a value of one, and another variable, x, is initialized to a value of zero. The meaning of these variables is now explained. It will first be understood that in this very simple embodiment, the UE has no information about how many TX antennas were used to transmit the PBCH block. Accordingly, the UE blindly makes an initial assumption that only one TX antenna was used (TXAntennas=1), and tries to decode the PBCH block using this assumption. If decoding turns out to be incorrect, it will blindly make a different assumption (e.g., TXAntennas=2) and try again. If this, too, fails, the UE makes yet another blind assumption (e.g., TXAntennas=4) and keeps doing so until all possibilities are exhausted. (In the exemplary embodiments, there are only three possibilities, namely, one, two, or four TX antennas.)

It will further be recalled that in exemplary embodiments, an encoded PBCH block is conveyed over the course of four consecutive radio frames, each radio frame conveying what is herein referred to as a "PBCH sub-block". Because of the coding and depending on radio channel conditions, it may be possible for the UE to successfully decode the PBCH information based on fewer than all four PBCH sub-blocks. Thus, the variable x represents the number of PBCH sub-blocks that have been received. Because of the timing uncertainty, the first PBCH sub-block received by the UE may represent any one of the first, second, third, or fourth of the four sub-blocks. Those of ordinary skill in the art will readily appreciate from this that it may be necessary (in this exemplary embodiment) for the UE to receive as many as seven sub-blocks before it is able to resolve the timing uncertainty and correctly decode the PBCH block (e.g., if the first received PBCH sub-block is actually the second of the four, the UE would first receive the second, third, and fourth before then being able to read up to all four in sequence—first, second, third, and fourth—thereby being able to decode the PBCH block). Accordingly, as will be further discussed below, the simple strategy involves receiving and attempting to decode up to seven PBCH sub-blocks before making a different blind guess about how many TX antennas were used to transmit the PBCH block.

After initializing local variables, the UE receives a PBCH sub-block (step 903). This includes activation of receiver circuitry to capture symbols 0-3 on the 72 central frequencies in slot 1 of sub-frame 0. The receiver circuitry includes well-known circuitry such as FFT, equalization of detected channel propagation paths, demodulation and descrambling circuitry. Thus, any further description of these elements is beyond the scope of the various inventive aspects.

The local variable, x, is incremented (step 905) so that it will accurately represent how many PBCH sub-blocks have been received for the given guess regarding the number of TX antennas being used. The UE circuitry then utilizes the guess regarding the number of TX antennas when it tries to decode the received PBCH symbols (step 907). This decoding operation can be applied to all symbols received so far (e.g., from one or more PBCH sub-blocks) in order to improve the chances of successful decoding.

Whether the decoding was successful is indicated by any of three cyclic redundancy check (CRC) masks (CRC0, CRC1, and CRC2) that are defined by the standards. A match between any one of three received values (CRC0, CRC1, and CRC2) and a respective one of three locally-computed values indicates that decoding of the PBCH block was successful. Therefore, the UE checks to see whether a match exists for any of the three CRC masks (decision block 909). If so ("YES" path out of decision block 909), then decoding has been successfully accomplished. The UE therefore can and does report the PBCH information, which includes the MIB, the 40 ms timing, and the number of TX antennas being used by the eNodeB (step 915). PBCH reception is then complete (step 917).

However, if none of the CRC checks are alright ("NO" path out of decision block 909), further reception processing is performed. One possibility for unsuccessful processing relates to the fact that channel conditions may require reception of more PBCH sub-blocks, or that the timing uncertainty requires reception of more PBCH sub-blocks. Therefore, the UE tests the variable x to determine whether the maximum number of necessary PBCH sub-blocks (in this example, 7) has already been received (decision block 911). If not ("NO" path out of decision block 911), processing reverts back to step 903 activate reception of another PBCH sub-block and another subsequent decoding attempt.

However, if the maximum number of necessary PBCH sub-blocks (e.g., 7) has already been received, then a reason for decoding failure may be due to an incorrect guess about the number of TX antennas being used by the eNodeB. Accordingly, if the maximum necessary number of PBCH sub-blocks has already been received ("YES" path out of decision block 911), then the loop is initialized begin all over again, this time with another guess about the number of TX antennas. The guess regarding the number of TX antennas (i.e., the variable #TXAntennas) is blindly incremented to a next guess, and the variable x, indicating the number of received sub-blocks, is reset to a value of zero (step 913). Processing then reverts back to step 903 to try PBCH reception all over again, this time with a different guess regarding the number of TX antennas being used by the eNodeB.

Figure 10:
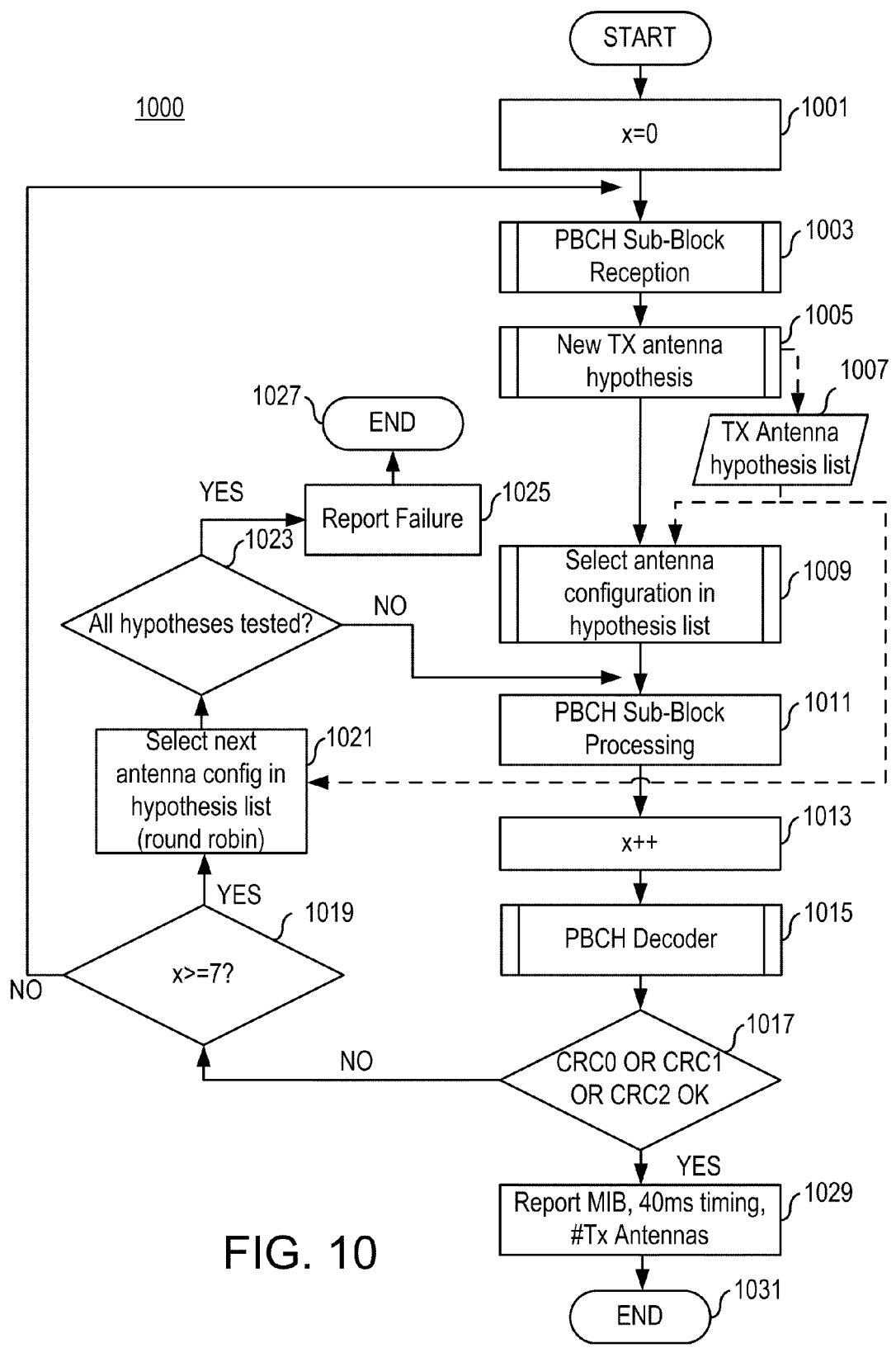
FIG. 10 is, in one respect, a flow diagram of exemplary steps/processes carried out in one or more components of a mobile communication system in accordance with aspects of the invention in an exemplary embodiment.

In an aspect of embodiments consistent with the invention, PBCH reception performance is improved by making intelligent hypotheses regarding the number of TX antennas being used by the eNodeB. This will be illustrated in FIG. 10 which is, in one respect, a flow diagram of exemplary steps/processes carried out in one or more components of a mobile communication system in accordance with aspects of the invention in an exemplary embodiment. FIG. 10 can also be considered to depict a mobile communication system 1000 comprising various circuitry configured to carry out the functions described herein.

The scenario begins with initialization of a local variable, x, to a value of zero (step 1001). As explained earlier, an encoded PBCH block is conveyed over the course of four consecutive radio frames, each radio frame conveying what is herein referred to as a "PBCH sub-block". Because of the coding and depending on radio channel conditions, it may be possible for the UE to successfully decode the PBCH information based on fewer than all four PBCH sub-blocks. Thus, the variable x represents the number of PBCH sub-blocks that have been received. Because of the timing uncertainty, the first PBCH sub-block received by the UE may represent any one of the first, second, third, or fourth of the four sub-blocks. Those of ordinary skill in the art will readily appreciate from this that it may be necessary (in this exemplary embodiment) for the UE to receive as many as seven sub-blocks before it is able to resolve the timing uncertainty and correctly decode the PBCH block (e.g., if the first received PBCH sub-block is actually the second of the four, the UE would first receive the second, third, and fourth before then being able to read up to all four in sequence—first, second, third, and fourth—thereby being able to decode the PBCH block). Accordingly, the strategy employed here involves receiving and attempting to decode up to seven PBCH sub-blocks before a different hypothesis regarding how many TX antennas were used to transmit the PBCH block is forced to take place. (As will be seen below, it is actually possible, but not necessary, to change the hypothesis regarding the number of TX antennas before all maximum necessary (e.g., 7) PBCH sub-blocks are received, if it appears that such a change will increase the likelihood of successful decoding.)

After initializing the local variable x, the UE receives a PBCH sub-block (step 1003). This includes activation of receiver circuitry to capture symbols 0-3 on the 72 central frequencies in slot 1 of sub-frame 0. The receiver circuitry includes well-known circuitry such as FFT, equalization of detected channel propagation paths, demodulation and descrambling circuitry. Thus, any further description of these elements is beyond the scope of the various inventive aspects.

Next, in an aspect of embodiments consistent with the invention, the number of TX antennas being used by the eNodeB is estimated based on one or more characteristics of the received signal (step 1005). In one nonlimiting example, the number of TX antennas can be estimated based on Reference Symbols located in the received signal. For example, in an approach using a measurement similar to Reference Signal Received Power (RSRP), a coarse channel estimation can be obtained and suitable filtering applied. Then, the power on each path is computed. Results for each of the RX antennas are combined so that the received power from each of TX antennas (e.g., in our 3GPP example, TX antennas 0, 1, 2 and 3) is obtained. Each Tx antenna transmits pilots/reference signals in known locations of the time/frequency grid. Thus, the generated RSRP represents a measure of correlation between the received signal and the known reference signal pattern; such a correlation reveals the presence of a Tx antenna. These correlation values are therefore fed into a decision block that, for example by comparison with threshold values, generates an informed hypothesis regarding how many antennas (e.g., 1, 2 or 4) are being using by the eNodeB. In some embodiments, the decision is made, for example, by means of programmable threshold values. Threshold values derived from simulations can be used to qualify/disqualify the presence of a particular TX antenna.

The described approach to making intelligent hypotheses about the number of TX antennas being used by the eNodeB is merely an example; other methods are also possible and suitable for use in alternative embodiments consistent with the invention.

The results of TX antenna hypothesis are incorporated into a stored list (step 1007). In an exemplary embodiment, the hypothesis list contains the possible number of TX antennas and an associated metric or probability value. Metric/probability values for each antenna derived in previously received PBCH sub-blocks may be overwritten. Alternatively, such information may be combined with a most-recently determined value by, for example, averaging the metric/probability values for each of the possible TX antennas.

Next, a most-likely antenna configuration hypothesis is made based on information obtained in the TX antenna hypothesis list (step 1009). (The dotted lines in FIG. 10 represent a flow of information.) The received signal generated as an output of P-BCH block reception (step 1003) is then processed (step 1011), with the present TX antenna hypothesis being utilized therein (i.e., the processing performed in step 1011 is dependent on how many/which ones of the possible TX antennas are assumed to exist). Such processing can include, for example, demodulation. In some embodiments, descrambling of symbols is performed here as well. In alternative embodiments, descrambling can be performed later as part of a decoding process.

The local variable, x, is incremented as well (step 1013) so that it will accurately represent how many PBCH sub-blocks have been received for the given hypothesis regarding the number of TX antennas being used. The UE circuitry then utilizes the hypothesis regarding the number of TX antennas when it tries to decode the received PBCH symbols (step 1015). This decoding operation can be applied to all symbols received so far (e.g., from one or more PBCH sub-blocks) in order to improve the chances of successful decoding. The number of different decoding hypotheses can be different from one embodiment to another.

Whether the decoding was successful is indicated by any of three cyclic redundancy check (CRC) masks (CRC0, CRC1, and CRC2) that are defined by the standards. A match between any one of three received values (CRC0, CRC1, and CRC2) and a respective one of three locally-computed values indicates that decoding of the PBCH block was successful. In alternative embodiments, the technique can be optimized to only check the CRC for the antenna hypothesis currently being tested (i.e., CRC0 is relevant to the case of just one TX antenna; CRC1 is relevant to the case of 2 TX antennas; and CRC3 is relevant to the case of 4 TX antennas). Therefore, in the first embodiment the UE checks to see whether a match exists for any of the three CRC masks (decision block 1017) (of in the optimized embodiment, the UE checks to see whether a match exists for the CRC associated with the current hypothesis). If so ("YES" path out of decision block 1017), then decoding has been successfully accomplished. The UE therefore can and does report the PBCH information, which includes the MIB, the 40 ms timing, and the number of TX antennas being used by the eNodeB (step 1029). PBCH reception is then complete (step 1031).

However, if none of the CRC checks are alright ("NO" path out of decision block 1017), further reception processing is performed. One possibility for unsuccessful processing relates to the fact that channel conditions may require reception of more PBCH sub-blocks, or that the timing uncertainty requires reception of more PBCH sub-blocks. Therefore, the UE tests the variable x to determine whether the maximum number of necessary PBCH sub-blocks (in this example, 7) has already been received (decision block 1019). If not ("NO" path out of decision block 1019), processing reverts back to step 1003 activate reception of another PBCH sub-block and another subsequent decoding attempt. It will be observed here that, since a new antenna hypothesis will be made subsequent to step 1003, the next attempt at PBCH reception could apply a different TX antenna hypothesis than had just been used, even if all of the maximum number of sub-blocks (e.g., 7) had not yet been received. Such an approach can benefit performance. However, in alternative embodiments, the present TX antenna hypothesis can be held constant until all of the maximum number (e.g., 7) of PBCH sub-blocks have been received and decoding attempted.

If the maximum number of necessary PBCH sub-blocks (e.g., 7) has already been received, then a reason for decoding failure may be due to an incorrect hypothesis about the number of TX antennas being used by the eNodeB. Accordingly, if the maximum necessary number of PBCH sub-blocks has already been received ("YES" path out of decision block 1019), then the next most likely TX antenna hypothesis is selected from the TX antenna hypothesis list (step 1021). If it turns out that all possible TX antenna hypotheses (e.g., 3 hypotheses) have been tried ("YES" path out of decision block 1023), then PBCH reception has failed, and this is reported as an output of the PBCH reception process (step 1025). Processing is then terminated (step 1027).

However, if another TX antenna hypothesis remains to be tried ("NO" path out of decision block 1023), then processing reverts back to step 1011, where the PBCH sub-block processing is again attempted based on the previously stored output from PBCH reception (i.e., output of step 1003) and the most-recent TX antenna hypothesis. Processing then repeats as previously described.

To achieve processing efficiency, the variable x need not be reset to zero, but instead can be maintained at its present value, since the PBCH processing (step 1011) and decoding (step 1015) will operate on the maximum number of necessary PBCH sub-blocks (e.g., 7) that have been previously stored from a previously performed iteration of the loop. In alternative embodiments, it is not necessary to perform second and subsequent iterations based on previously stored PBCH sub-blocks. Instead, the variable x can be reset to zero, and processing can instead revert back to step 1003 to permit a freshly received one or more PBCH sub-blocks to be received and processed.

At some point it will be determined that all possible TX antenna hypotheses have been attempted on the maximum number of necessary PBCH sub-blocks ("YES" path out of decision block 1023), and processing will then conclude as previously described (i.e., failure processing).

Figure 11:
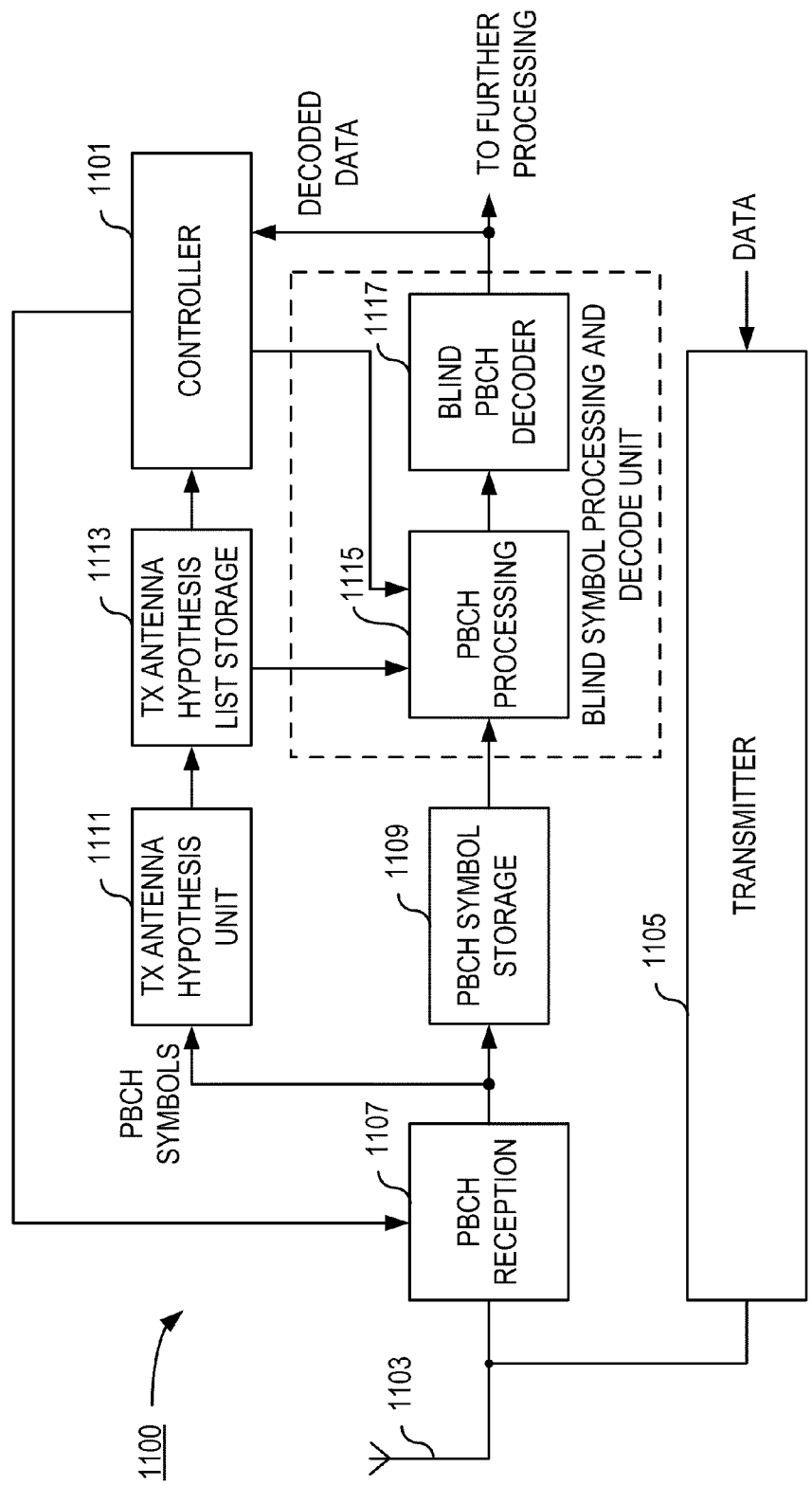
FIG. 11 is a block diagram of an exemplary UE that operates in accordance with aspects of the invention.

FIG. 11 is a block diagram of an exemplary UE 1100 that operates in accordance with aspects of the invention as described above. The various elements are operated under the direction of control signals generated by controller circuitry 1101. The controller circuitry causes the UE to carry out processing such as that which has been described with reference to FIG. 10. To facilitate an understanding of relevant aspects, many of the control circuitry's control signals have been omitted from the drawing. Those of ordinary skill in the art will appreciate that such signals would propagate from the controller circuitry 1101 to one or more elements within the UE 1100.

Also to simplify the diagram, the UE 1100 is illustrated having a single antenna 1103, which is shared between a transmitter portion 1105 and receiver elements (described further below). Those of ordinary skill in the art will appreciate that in some embodiments the UE 1100 can include and utilize more than one antenna (e.g., in Multiple Input Multiple Output—so-called "MIMO"—implementations), and that in some embodiments dedicated antennas can be provided separately for receive and transmission paths.

A received signal is supplied by the antenna 1103 to PBCH reception circuitry 1107. The PBCH reception circuitry 1107 is configured to carry out functions including those described above with reference to step 1003. The output of the PBCH reception circuitry 1107 is supplied to a PBCH symbol storage unit 1109, since these will be referenced (possibly multiple times) in later processing.

The output of the PBCH reception circuitry 1107 is also supplied to TX antenna hypothesis circuitry 1111. The TX antenna hypothesis circuitry 1111 is configured to make a present TX antenna hypothesis based on the received signal, as described earlier with reference to step 1005. The hypothesis generated by the TX antenna hypothesis circuitry is supplied to a TX antenna hypothesis list storage unit 1113, which maintains the TX hypothesis list described earlier. Also as described above, the present TX antenna hypothesis and associated metric/probability values can simply be stored into the TX antenna hypothesis list storage unit 1113, or alternatively can be combined with previously stored values prior to storage. Such combining can, for example, be performed under the direction of control signals generated by the controller circuitry 1101.

The controller circuitry 1101 also causes TX antenna hypotheses to be selected, starting with a most-likely hypothesis and continuing as necessary with next-most-likely and so on in round robin fashion. The selected TX antenna hypothesis is supplied to PBCH processing circuitry 1115, which is configured to perform processing including that which has been described above with reference to step 1011. The output of the PBCH processing circuitry 1115 is supplied to blind PBCH decoder circuitry 1117, which is configured to perform processing including that which has been described above with reference to step 1015. The PBCH processing circuitry 1115 and blind PBCH decoder circuitry 1117 can, together, be considered to constitute a blind symbol processing and decoding unit.

The controller circuitry 1101 checks the output of the blind PBCH decoder circuitry 1117 (e.g., by CRC checking), and detects whether the PBCH block has been correctly received and decoded. If so, the decoded symbols are supplied to further processing in the UE, as is known in the art. Otherwise, the controller circuitry 1117 directs the UE's circuitry to make further attempts at PBCH reception as described earlier.

Embodiments consistent with the various inventive aspects reduce PBCH reception complexity by using an intelligently generated TX antenna hypothesis list. Metrics/probability values stored in the TX antenna hypothesis list are generated based on one or more characteristics of a received signal. This approach yields a number of benefits, including lower power consumption associated with PBC reception, and an increase in average speed of system information reception.

For example, in the best case in which the number of TX antennas is always guessed correctly, the number of decoding attempts is reduced by 66% compared to the most simple PBCH reception approach in which processing circuitry makes non-informed guesses about how many TX antennas are being used by the eNodeB. And even in worst case scenarios, in which the contents of the TX antenna hypothesis list do not accurately represent which TX antenna configurations are most likely, the various inventive embodiments perform no worse than the most simple approach.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a radio receiver to receive information from a signal transmitted on a physical broadcast channel, wherein the radio receiver includes a blind processing and decoding unit that operates in accordance with a blind decoder algorithm that requires that a hypothesis be made about how many transmit antennas were used to transmit the signal, the method comprising:

receiving a signal;

detecting one or more characteristics of the received signal that are indicative of how many transmit antennas were used to transmit the signal;

accessing a stored list of transmit antenna hypotheses, wherein each of the transmit antenna hypotheses represents how many transmit antennas were used to transmit the signal;

for each of the transmit antenna hypotheses stored in the list, determining a probability value based, at least in part, on the detected one or more characteristics of the received signal;

modifying the stored list of transmit antenna hypotheses to associate the probability values with respective ones of the transmit antenna hypotheses; and using the modified stored list of transmit antenna hypotheses to provide antenna hypothesis probabilities, and operating the blind processing and decoding unit such that the blind processing and decoding unit begins with a most probable antenna hypothesis and continues with increasingly less probable antenna hypotheses until either a successful decoding of the signal has occurred or all antenna hypotheses have been made.

2. The method of claim 1, wherein determining the probability value of a transmit antenna hypothesis comprises:

determining from the detected one or more characteristics of the received signal whether a particular one of a number of possible antennas was used to transmit the signal.

3. The method of claim 2, wherein determining the probability value of a transmit antenna hypothesis is further based, at least in part, on a previously stored probability value associated with the transmit antenna hypothesis.

4. The method of claim 3, wherein determining the probability value of a transmit antenna hypothesis comprises:

averaging a probability value representing a likelihood that the particular one of the number of possible antennas was used to transmit the signal with one or more previously stored probability values associated with the particular one of the number of possible antennas.

5. The method of claim 1, wherein detecting one or more characteristics of the received signal that are indicative of how many transmit antennas were used to transmit the signal comprises:

detecting whether a reference symbol is present at a predefined time and frequency location within the received signal.

6. The method of claim 1, wherein the physical broadcast channel spans a plurality of radio frames and the method comprises:

the blind processing and decoding unit identifying a radio frame that includes an initial part of the information.

7. The method of claim 1, wherein the information is a master information block.

8. An apparatus in a radio receive for receiving information from a signal transmitted on a physical broadcast channel, wherein the radio receiver includes a blind processing and decoding unit that operates in accordance with a blind decoder algorithm that requires that a hypothesis be made about how many transmit antennas were used to transmit the signal, the method comprising:
   circuitry configured to receive the signal;
   circuitry configured to detect one or more characteristics of the received signal that are indicative of how many transmit antennas were used to transmit the signal;
   circuitry configured to access a stored list of transmit antenna hypotheses, wherein each of the transmit antenna hypotheses represents how many transmit antennas were used to transmit the signal;
   circuitry configured to determine a probability value for each of the transmit antenna hypotheses stored in the list, each probability value being based, at least in part, on the detected one or more characteristics of the received signal;
   circuitry configured to modify the stored list of transmit antenna hypotheses to associate the probability values with respective ones of the transmit antenna hypotheses; and
   circuitry configured to use the modified stored list of transmit antenna hypotheses to provide antenna hypothesis probabilities, and to operate the blind processing and decoding unit such that the blind processing and decoding unit begins with a most probable antenna hypothesis and continues with increasingly f probable antenna hypotheses until either a successful decoding of the signal has occurred or all antenna hypotheses have been made.

9. The apparatus of claim 8, wherein the circuitry configured to determine the probability value of a transmit antenna hypothesis comprises:
   circuitry configured to determine from the detected one or more characteristics of the received signal whether a particular one of a number of possible antennas was used to transmit the signal.

10. The apparatus of claim 9, wherein the circuitry configured to determine the probability value of a transmit antenna hypothesis further determines the probability value based, at least in part, on a previously stored probability value associated with the transmit antenna hypothesis.

11. The apparatus of claim 10, wherein the circuitry configured to determine the probability value of a transmit antenna hypothesis comprises:
   logic configured to average a probability value representing a likelihood that the particular one of the number of possible antennas was used to transmit the signal with one or more previously stored probability values associated with the particular one of the number of possible antennas.

12. The apparatus of claim 8, wherein the circuitry configured to detect one or more characteristics of the received signal that are indicative of how many transmit antennas were used to transmit the signal comprises:
   logic configured to detect whether a reference symbol is present at a predefined time and frequency location within the received signal.

13. The apparatus of claim 8, wherein the physical broadcast channel spans a plurality of radio frames and the apparatus comprises:
   the blind processing and decoding unit, including circuitry configured to identify a radio frame that includes an initial part of the information.

14. The apparatus of claim 8, wherein the information is a master information block.

15. A computer readable storage medium having stored thereon a set of program instructions that, when executed by one or more processors, causes a radio receiver to receive information from a signal transmitted on a physical broadcast channel, wherein the radio receiver includes a blind processing and decoding unit that operates in accordance with a blind decoder algorithm that requires that a hypothesis be made about how many transmit antennas were used to transmit the signal, the set of program instructions comprising instructions that cause the radio receiver to perform:
   receiving a signal;
   detecting one or more characteristics of the received signal that are indicative of how many transmit antennas were used to transmit the signal;
   accessing a stored list of transmit antenna hypotheses, wherein each of the transmit antenna hypotheses represents how many transmit antennas were used to transmit the signal;
   for each of the transmit antenna hypotheses stored in the list, determining a probability value based, at least in part, on the detected one or more characteristics of the received signal;
   modifying the stored list of transmit antenna hypotheses to associate the probability values with respective ones of the transmit antenna hypotheses; and
   using the modified stored list of transmit antenna hypotheses to provide antenna hypothesis probabilities, and operating the blind processing and decoding unit such that the blind processing and decoding unit begins with a most probable antenna hypothesis and continues with increasingly less probable antenna hypotheses until either a successful decoding of the signal has occurred or all antenna hypotheses have been made.

16. The computer readable storage medium of claim 15, wherein determining the probability value of a transmit antenna hypothesis comprises:
   determining from the detected one or more characteristics of the received signal whether a particular one of a number of possible antennas was used to transmit the signal.

17. The computer readable storage medium of claim 16, wherein determining the probability value of a transmit antenna hypothesis is further based, at least in part, on a previously stored probability value associated with the transmit antenna hypothesis.

18. The computer readable storage medium of claim 17, wherein determining the probability value of a transmit antenna hypothesis comprises:
   averaging a probability value representing a likelihood that the particular one of the number of possible antennas was used to transmit the signal with one or more previously stored probability values associated with the particular one of the number of possible antennas.

19. The computer readable storage medium of claim 15, wherein detecting one or more characteristics of the received signal that are indicative of how many transmit antennas were used to transmit the signal comprises:
   detecting whether a reference symbol is present at a predefined time and frequency location within the received signal.

20. The computer readable storage medium of claim 15, wherein the physical broadcast channel spans a plurality of radio frames and the set of instructions comprises instructions that cause the blind processing and decoding unit to identify a radio frame that includes an initial part of the information.

\* \* \* \* \*